United States Patent [19]

Blount, Sr.

[11] Patent Number: 4,671,253

[45] Date of Patent: Jun. 9, 1987

[54] PRE-HEATER FOR WATER HEATER

[76] Inventor: Eldon R. Blount, Sr., 357 Halfway Tree Rd., Baton Rouge, La. 70810

[21] Appl. No.: 794,768

[22] Filed: Nov. 4, 1985

[51] Int. Cl.⁴ .............................................. F24J 2/04
[52] U.S. Cl. .................................... 126/437; 126/420
[58] Field of Search ............... 126/431, 437, 432, 417, 126/419, 420, 422, 429, 427, 362, 365; 165/48.2, 47

[56] References Cited

U.S. PATENT DOCUMENTS

| | | | |
|---|---|---|---|
| 629,122 | 7/1899 | Davis | 126/437 |
| 1,338,644 | 4/1920 | Arthur et al. | 126/427 X |
| 3,902,474 | 9/1975 | Pyle | 126/429 X |
| 3,989,032 | 11/1976 | Harrison | 127/271 |
| 4,010,734 | 3/1977 | Chayet | 126/271 |
| 4,051,999 | 10/1977 | Granger et al. | 126/431 X |
| 4,119,087 | 10/1978 | Cook | 126/420 |
| 4,133,338 | 1/1979 | Honikman | 126/420 |
| 4,153,955 | 5/1979 | Hinterberger | 126/271 |
| 4,159,017 | 6/1979 | Novi | 126/271 |
| 4,191,329 | 3/1980 | Gcaslin | 126/427 |
| 4,196,718 | 4/1980 | Neustein | 127/427 |
| 4,242,827 | 1/1981 | Shaw | 126/427 X |
| 4,257,397 | 3/1981 | Gouyos | 126/427 |
| 4,368,549 | 1/1983 | Ramey | 126/415 |
| 4,384,568 | 5/1983 | Palmatier | 126/437 X |
| 4,479,487 | 10/1984 | Migdal | 126/422 |
| 4,517,958 | 5/1985 | Worf | 126/431 X |

Primary Examiner—Randall L. Green
Attorney, Agent, or Firm—David L. Ray

[57] ABSTRACT

Apparatus for pre-heating water prior to the water entering a conventional water heater including a heat exchanger means located in the attic of a residential dwelling for effecting a heat exchange between a hot air in the attic and water flowing through the heat exchanger, the heat exchanger having an inlet for receiving tap water and outlet for discharging heated tap water, and a water heater connected to the outlet of the heat exchanger for receiving heated water from the heat exchanger and for heating the pre-heated water to higher temperature. Preferably, the heat exchanger is a length of pipe located entirely within the attic of a residential dwelling having a sufficient length and volume to effect exchange between hot air trapped in a residential attic and tap water flowing through the pipe.

2 Claims, 2 Drawing Figures

PRE-HEATER FOR WATER HEATER

BACKGROUND OF THE INVENTION

1. Field of the Invention

The present invention relates to a method and apparatus for pre-heating water prior to the water entering a conventional residential gas or electric water heater. More particularly, the present invention relates to a method and apparatus for pre-heating water prior to the water being heated by a conventional gas or electric water heater by effecting a heat exchange between tap water and the hot air trapped in the attic of a conventional residential dwelling prior to the water being introduced to a conventional gas or electric water heater contained in the dwelling.

2. Description of the Prior Art

Conventional residential and commercial water heaters commonly receive water directly from a municipal or governmental water supply, or a private well. This water is commonly referred to as tap water. Tap water is normally relatively cool having a temperature generally less than 90° degrees F. It is well known in the art that the higher the temperature of the water entering the hot water heater the less energy required to heat the water to a desired temperature for discharge from the hot water heater. Commonly, residential hot water heaters have a hot water discharge temperature of about 140° degrees F.

Many devices have been disclosed in the prior art for utilizing a solar heat collector to supplement or in some cases replace the hot water heater in a residential dwelling. Exemplary of these patents are the following:

U.S. Pat. No. 3,989,032 discloses a system for solar heating of water in combination with a domestic hot water system having a hot water storage tank. The solar heater utilized has a surface which absorbs sunlight to produce heat, and a heat exchange passage for water in the solar heat collector.

U.S. Pat. No. 4,010,734 discloses a solar heating system including a solar collector, a water storage tank and water lines therebetween. The solar collector preferably includes a continuous length of the tubing coiled in a helical array of closely adjacent turns, having a water inlet communicating with the outermost turn and a water outlet communicating with the innermost turn. The solar collector is exposed to the direct rays of the sun and provides hot water for storage in a storage tank.

U.S. Pat. No. 4,153,955 discloses a solar heating device which utilizes a solar energy converter employing a stationary mirror which reflects and focuses solar radiation onto a tank of continuous radiation concentrators through which a liquid is selectively passed as the focussed radiation passes there across as the elevation of the sun changes during the day. This system provides for greater concentration of the rays of the sun on the solar energy converter throughout the course of the day.

U.S. Pat. No. 4,159,017 discloses a solar heating panel having a rectangular frame to receive a rectangular metal pan which supports a continuous coil of water tubing which is attached thereto by strips of metal attached to the pan. The solar heating panel is exposed to the direct rays of the sun and closed off by a pane of glass. The solar heating panel can be incorporated in a household water system and also to heat space.

U.S. Pat No. 4,191,329 discloses a hot water solar system which heats water in solar panels exposed to the direct radiation from the sun. From the solar panels the water is circulated through a supplemental heater and through a domestic heating system and thus made available for domestic use in washes and baths. In the event the solar panels will not increase the temperature of the water $1\frac{1}{2}$ degrees C. the water is not circulated through the solar panel but merely circulated back through the supplemental heater in the household loop.

U.S. Pat. No. 4,196,718 discloses a solar heating system for a building in which the liquid in the solar cell is subjected both to radiation from the sun and to heat from the exhaust chimney gases from the building furnace. The fluid in the tubes is heated by radiation and is circulated to a fluid reservoir where the fluid is drawn when required.

U.S. Pat. No. 4,257,397 discloses an apparatus for heating water with solar radiation incorporating an auxiliary heating unit external to the hot water reservoir and by-passing the solar heating element, for providing auxiliary water heating whenever the temperature in a selected portion of the reservoir decreases below a pre-determined level.

U.S. Pat. No. 4,368,549 discloses a swimming pool heater temperature control system designed to optimize the use of a conventional heater as a supplemental heat source for a solar heated swimming pool. The temperature control system operates by automaticaly adjusting the temperature setting of the heater to conform to the temperature vs. time profile of an optimum solar collector heating system.

SUMMARY OF THE INVENTION

In accordance with the present invention there is provided a method and apparatus for pre-heating water prior to the water entering a conventional water heater including a heat exchanger means located in the attic of a residential dwelling for effecting a heat exchange between hot air in the attic and water flowing through the heat exchanger, the heat exchanger having an inlet for receiving tap water and outlet for discharging heated tap water, and a water heater connected to the outlet of the heat exchanger for receiving heated water from the heat exchanger and for heating the pre-heated water to higher temperature. Preferably, the heat exchanger is a length of pipe located entirely within the attic of a residential dwelling having a sufficient length and volume to effect a heat exchange between hot air trapped in a residential attic and tap water flowing through the pipe.

The present invention provides an inexpensive method for decreasing the energy costs necessary to heat water in a residential dwelling. The apparatus and method of the invention is low in cost and does not require that the existing roof be modified as is necessary for installation of solar heaters of the prior art. The heat exchanger of the invention is not exposed directly to the radiation of the sun but rather is exposed to the hot air trapped in the attic of a residential dwelling.

BRIEF DESCRIPTION OF THE DRAWINGS

The invention will be more fully understood by reference to the drawings in which.

DESCRIPTION OF THE PREFERRED EMBODIMENTS

Figure 1:
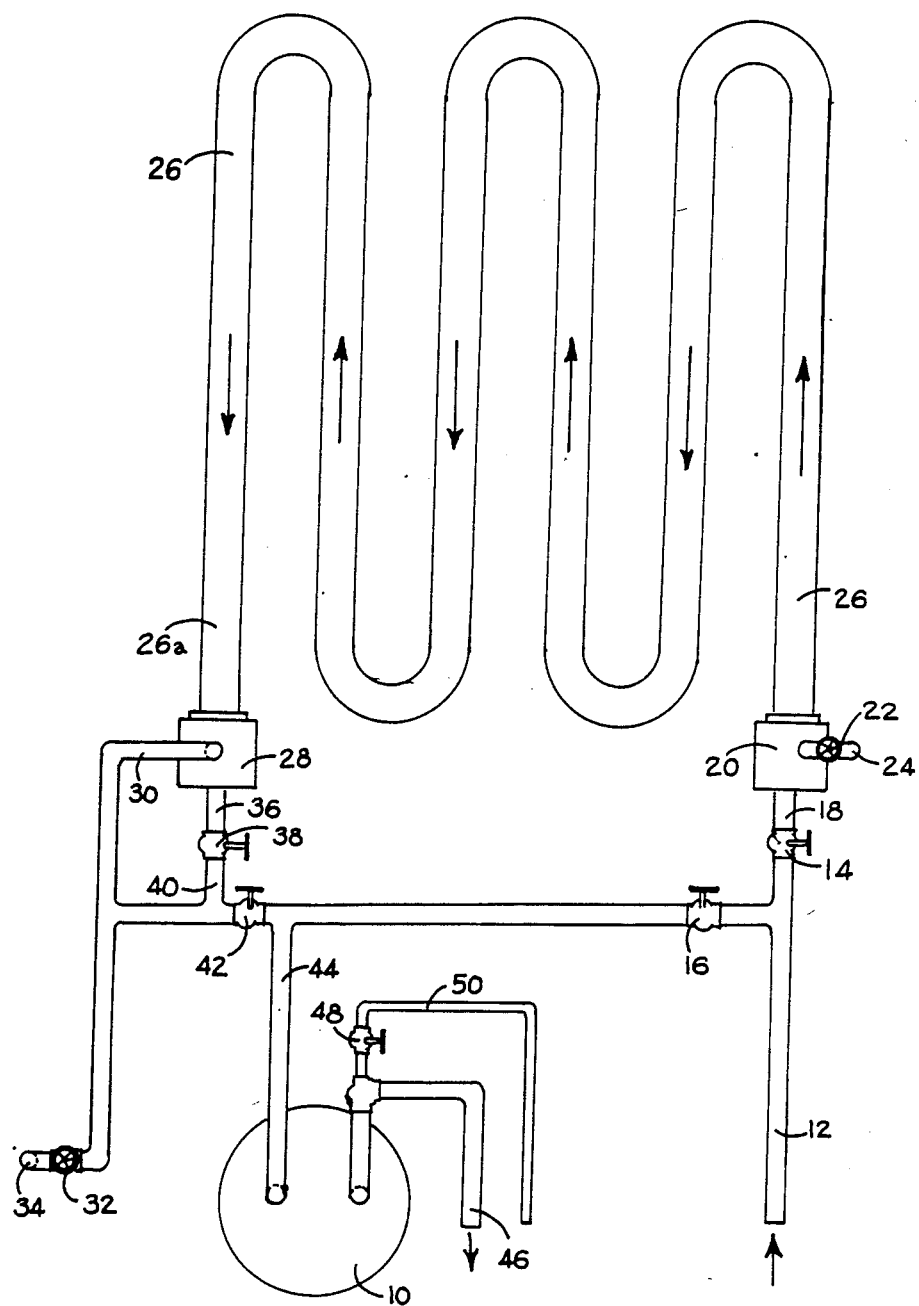
FIG. 1 is a schematic view of the apparatus of the invention wherein the heat exchanger is aligned in a horizontal plane relative to a vertical hot water reservoir.

Referring now to the drawings, in FIG. 1 is shown an embodiment of the invention in which the heat exchanger of the invention is arranged in a horizontal plane relative to the hot water storage reservoir. In FIG. 1, the hot water reservoir is generally indicated by the numeral 10. Hot water reservoir 10 can be a conventional water heater used in a residential dwelling which may include a heating element for heating the water to be stored in hot water reservoir 10.

Tap water from a water supply such as a well or municipality enters the apparatus of the invention through inlet pipe 12 under conventional tap water pressure and continues on through pipe 12 to valve 14 and valve 16. When it is desired to use the heat exchanger of the invention, valve 16 is closed and valve 14 is opened.

Water continues through pipe 18 and through connector 20. Connector 20 has a vent pipe 22 having valve 24 connected at the upper end thereof which is closed when the system of the invention is in operation. Connector 20 connects smaller diameter pipe 18 to larger diameter pipe 26 and permits a flow therethrough, as indicated by the arrows in pipe 26. Pipe 26 has a sufficient length and volume to hold a desired amount of water is to be pre-heated by the hot air contained in the attic of a residential dwelling.

For example, it has been found that if the total length of pipe 26 is 120 feet and the volume of pipe 26 is 24 gallons, a sufficient volume of water is contained in pipe 26 to effect significant savings in a typical residence.

Pipe 26 is preferably made from a plastic pipe such as schedule "Forty" polyvinyl chloride pipe which is placed in the attic of a residential dwelling and which is uninsulated. Commonly, attic temperatures reach levels of from about ambient temperature up to about 120° F.

The downstream end 26a of pipe 26 is connected to connector 28 and to air vent pipe 30 having valve 32 connected thereto. Valve 32 is closed when the preheating system is in operation and has an outlet 34 which is at a level beneath the level of horizontal pipe 26 so that water may be drained from pipe 26 when it is desired to flush the system and to prevent freezing of the water in pipes 26 on cold days. Heated water continues to flow through smaller diameter pipe 36 to valve 38 which is open when the invention is in operation. Water passes through valve 38 into pipe 40 and through valve 42 which is open when the system is in operation. Heated water then flows through pipe 44 to hot water reservoir 10.

Hot water reservoir 10 has a discharge pipe 46 and a conventional pop-off valve 48 connected to vent pipe 50. Pop-off valve 48 is normally closed and only is released if water in the hot water tank begins to boil and pressure increases to a level sufficient to endanger the hot water tank and pipes connected thereto.

If it is desired to operate the water heater without using the pre-heater of the invention, valve 14 is closed, valve 16 is opened and valve 42 is closed. The water heater 10 then operates as a conventional water heater.

If it is desired to drain the pre-heater of the invention, valve 14 is closed, valve 16 is opened, valve 42 is closed, vent valve 24 is opened, valve 38 is opened, and valve 32 is opened to allow water to drain from the system through valve 34 and air to enter the system through valve 24 and air vent 22.

Figure 2:
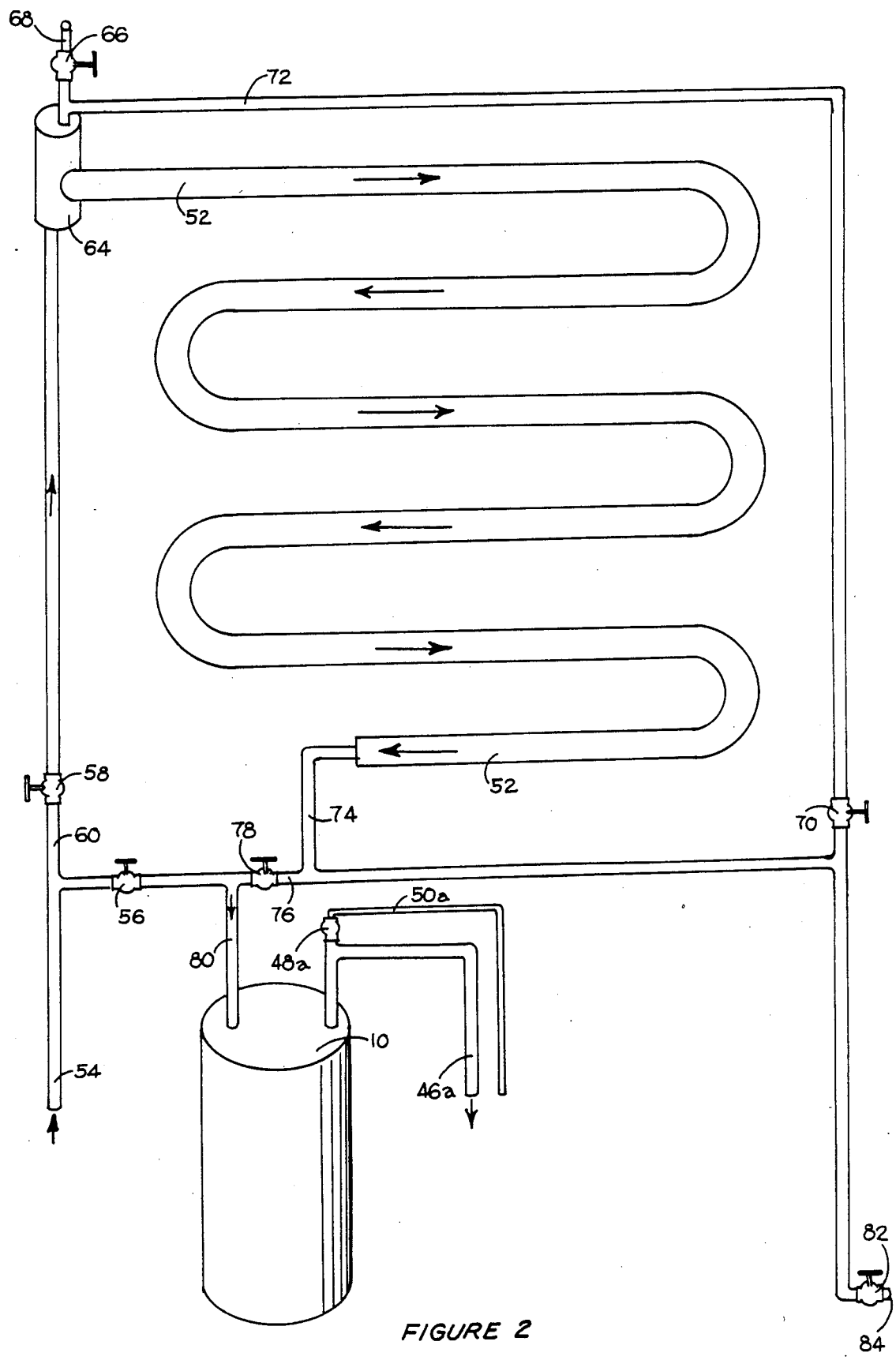
FIG. 2 is a schematic view of the invention in which the heat exchanger is arranged in a vertical plane relative to a vertical hot water reservoir.

Referring now to FIG. 2, there is shown a system in accordance with the present invention in which heat exchanger pipes 52 are arranged in a vertical plane in the attic of a residential dwelling. Tap water supplied by a well or municipality enters pipe 54. Valve 56 is closed and valve 58 is opened. Water travels upward from pipe 54 to pipe 60 and through open valve 58 to pipe 62. Water from pipe 62 enters adapter 64 and continues through pipe 52.

Valve 66 is connected to vent line 68 and is closed. Valve 70 is also closed to prevent water from traveling through line 72. Pipe 52 is similar to pipe 26 previously described in FIG. 1 and is of sufficient inside diameter and length to effect the heat exchange between the hot air in the attic of a residential dwelling and the water contained therein. Water continues to flow through pipe 52 as indicated by the arrows until the water reaches pipe 74. From pipe 74 water travels to pipe 76 and through open valve 78 and downwardly through pipe 80 to the inlet of hot water reservoir 10. Valve 82 connected to drain 84 is closed.

Hot water reservoir 10 of FIG. 2 has a hot water outlet 46a, pop-off valve 48a and vent line 50a similar to that previously described for hot water reservoir 10 of FIG. 1.

If it is desired to operate the hot water tank without utilizing the pre-heater of the present invention, valve 58 is closed, valve 56 is opened and valve 78 is closed. Thus tap water circulates through pipe 54, valve 56 and downwardly through inlet 80 to hot water tank 10.

If it is desired to drain the system shown in FIG. 2, valve 58 is closed, valve 78 is closed, valve 66 is opened, valve 70 is opened and valve 82 is opened to allow water to drain from the system.

It is important that pipes 26 described in FIG. 1 and pipes 52 described in FIG. 2 are located entirely inside of the attic of a residential dwelling or building to effect the heat exchange between the hot air in the attic and the water in pipes 26 and 52. Thus, there is no direct sunlight striking or impinging on pipes 26 and 52, and therefore there is no need to modify the roof of the dwelling.

Although the preferred embodiments of the present invention have been disclosed and described in detail above, it should be understood that the invention is in no sense limited thereby, and its scope is to be determined by that of the following claims.

What is claimed is:

1. An apparatus for pre-heating water prior to the water entering a conventional water heater comprising:
   a. heat exchanger means located inside the attic of a residential dwelling for effecting a heat exchange between hot air in said attic and water flowing through said heat exchanger, said heat exchanger having an inlet means for receiving tap water and an outlet means for discharging heated tap water, said heat exchanger means comprising a continuous pipe lying in a horizontal plane, said pipe having a sufficient length and volume to effect a heat exchange between hot air contained in a residential attic and tap water flowing through said pipe, said continuous pipe having first inlet pipe means connected thereto for introducing tap water into said continuous pipe, said first inlet pipe means having a first valve means connected thereto for selectively controlling the flow of tap water to said continuous pipe, said first inlet pipe means having second pipe means connected thereto upstream from said first valve means for diverting tap water directly to said water heater means when said first valve means is closed, said second pipe means having second valve means connected thereto for selectively controlling the flow of tap water directly to said water heater means, third pipe means connected to said continuous pipe for receiving heated tap water from said continuous pipe and conveying said heated tap water to said water heater means, said third pipe means having third valve means connected thereto for selectively controlling the flow of heated tap water from said continuous pipe to said water heater means, b. vent pipe means connected to said continuous pipe, said vent pipe means having fourth valve means connected thereto for selectively controlling the flow of air into said continuous pipe when water is being drained from said continuous pipe, c. drain pipe means connected to said continuous pipe for draining water from said continuous pipe, said drain pipe means having fifth valve means connected thereto for selectively controlling the flow of water being drained from said continuous pipe, d. fourth pipe means connected to said drain pipe means, to said third pipe means downstream from said third valve means, and to said second pipe means, said fourth pipe means having sixth valve means connected thereto downstream from the junction of said fourth pipe means and said third pipe means, said fourth pipe means being connected to said second pipe means downstream from said sixth valve means and said second valve means, e. fifth pipe means connected to the junction of said fourth pipe means and said second pipe means for conveying water to said water heater means, and f. said water heater means connected to said outlet of said heat exchanger means for receiving heated water from said heat exchanger means and heating said heated water to a higher temperature.

2. An apparatus for pre-heating water prior to the water entering a conventional water heater comprising:

a. heat exchanger means located inside the attic of a residential dwelling for effecting a heat exchange between hot air in said attic and water flowing through said heat exchanger, said seat exchanger having an inlet means for receiving tap water and an outlet means for discharging heated tap water, said heat exchanger means comprising a continuous pipe lying in a vertical plane, said pipe having a sufficient length and volume to effect a heat exchange between hot air contained in a residential attic and tap water flowing through said pipe, said continuous pipe having first inlet pipe means connected thereto for introducing tap water into the top end of said continuous pipe, said first inlet pipe means having a first valve means connected thereto for selectively controlling the flow of tap water to said continuous pipe, said first inlet pipe means having second pipe means connected thereto upstream from said first valve means for diverting tap water directly to said water heater means when said first valve means is closed, said second pipe means having second valve means connected thereto for selectively controlling the flow of tap water directly to said water heater means, and third pipe means connected to said continuous pipe means for receiving heated tap water from said continuous pipe means and conveying said heated tap water to said water heater means, b. vent pipe means connected to said continuous pipe at the top end of said continuous pipe, said vent pipe means having third valve means connected thereto for selectively controlling the flow of air into said continuous pipe when water is being drained from said continuous pipe, c. drain pipe means connected to the lower end of said continuous pipe for draining water from said continuous pipe, said drain pipe means having fourth valve means connected thereto for selectively controlling the flow of water being drained from said continuous pipe, d. fourth pipe means connected to said drain pipe means and to said third pipe means, said fourth pipe means having fifth valve means connected thereto downstream from said junction of said fourth pipe means and said third pipe means, said fourth pipe means being connected to said second pipe means downstream from fifth valve means and said second valve means, and e. fifth pipe means connected to the junction of said fourth pipe means and said second pipe means for conveying water to said water heater means, and f. said water heater means connected to said outlet of said heat exchanger means for receiving heated water from said heat exchanger means and heating said heated water to a higher temperature.

* * * * *